(12) United States Patent
Cemke et al.

(10) Patent No.: US 9,444,309 B2
(45) Date of Patent: Sep. 13, 2016

(54) RADIAL BLOWER AIR GUIDE, SYSTEM, AND METHOD OF COOLING

(71) Applicant: Regal Beloit America, Inc., Beloit, WI (US)

(72) Inventors: Lisa Marie Cemke, Schofield, WI (US); Christopher Thomas Ohrmundt, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 607 days.

(21) Appl. No.: 13/790,964

(22) Filed: Mar. 8, 2013

(65) Prior Publication Data

US 2014/0252895 A1  Sep. 11, 2014

(51) Int. Cl.
*H02K 5/20* (2006.01)
*H02K 9/04* (2006.01)
*H02K 9/14* (2006.01)
*H05K 7/20* (2006.01)
*H02K 9/06* (2006.01)

(52) U.S. Cl.
CPC ...... *H02K 9/14* (2013.01); *H02K 9/06* (2013.01); *Y10T 29/49826* (2015.01)

(58) Field of Classification Search
CPC ............ H05K 7/20; H02K 5/18; H02K 5/20; H02K 9/02; H02K 9/04; H02K 9/16
USPC ............... 361/678; 310/58, 61, 64, 90, 417
See application file for complete search history.

(56) References Cited

U.S. PATENT DOCUMENTS

| | | | | |
|---|---|---|---|---|
| 3,819,965 A | * | 6/1974 | Schoendube | H02K 9/04 310/58 |
| 4,922,146 A | * | 5/1990 | Vanduyn | H02K 9/02 310/64 |
| 6,294,852 B1 | * | 9/2001 | Lee | H02K 9/14 310/52 |
| 6,734,584 B1 | * | 5/2004 | Browne | H02K 9/14 310/58 |
| 6,798,096 B2 | | 9/2004 | Browne et al. | |
| 2009/0289513 A1 | * | 11/2009 | Vadillo | H02K 9/14 310/62 |

OTHER PUBLICATIONS

Blower Mount, Sold by Rotor, Aug. 2, 2011, Sales Order V11. 165508.

* cited by examiner

*Primary Examiner* — Michael Andrews
(74) *Attorney, Agent, or Firm* — Armstrong Teasdale LLP (57) ABSTRACT

A radial blower air guide includes a first end wall substantially circumscribing an end bracket of an electric motor. The air guide includes a second end wall spaced apart from the first end wall and has an inner periphery that circumscribes a periphery of the motor. The air guide includes an outer wall extending from an edge of the first end wall to an edge of the second end wall. The outer wall is formed from a thin curved plate and partially defines a ring-shaped chamber therebetween. The outer wall has an aperture defined therethrough. The air guide includes a baffle plate coupled to the inner periphery of the second end wall. The baffle plate extends a first width toward the first end wall and partially defines the chamber. The baffle plate is configured to deflect air to control the distribution of the airflow from the chamber.

20 Claims, 11 Drawing Sheets

RADIAL BLOWER AIR GUIDE, SYSTEM, AND METHOD OF COOLING

BACKGROUND

The field of the disclosure relates generally to air guides and, more specifically, to radial blower air guides for use in forced air cooling systems on electric motors.

Some electric motors include a stator and a rotor that are fully enclosed within a frame, including a housing and end brackets. The stator and rotor are generally enclosed to prevent damage from contaminants and other harmful substances in the operating environment. Because some of these totally enclosed electric motors generate heat during operation, the electric motor typically must be cooled to ensure efficient operation.

At least some totally enclosed electric motors include a motor driven external fan attached to the rotor shaft of the electric motor. Some of these totally enclosed fan cooled electric motors include an axial fan housed within a fan shroud to direct cooling air over the outer surface of the electric motor housing. The axial fan is connected at an end of the rotor shaft to boost air circulation over the electric motor housing to increase heat dissipation from the rotor and stator to the ambient environment.

At least some totally enclosed electric motors include a radial fan or blower, instead of an axial fan, to move the air over the electric motor housing. Generally, the radial blower is mounted to a special cast iron end bracket attached to the electric motor housing. The cast iron end bracket is configured to guide the air from the radial blower over the outside of the electric motor housing. The cast iron end bracket typically replaces a standard end bracket of the electric motor and can be heavy and expensive. In addition, the cast iron end bracket typically is not rated for use with explosion-proof motors.

BRIEF DESCRIPTION

In one aspect, an air guide for use with an electric motor is provided. The electric motor has a central longitudinal axis. The air guide includes a first end wall substantially circumscribing an end bracket of the electric motor. The air guide also includes a second end wall spaced apart from the first end wall. The second end wall has an inner periphery that substantially circumscribes a periphery of the electric motor. The air guide also includes an outer wall extending from an edge of the first end wall about at least a portion of its circumference. The outer wall extends to an edge of the second end wall. The outer wall is formed from a thin curved plate and at least partially defines a ring-shaped chamber between the first end wall and the second end wall. The outer wall also has an aperture defined therethrough. The air guide also includes a baffle plate coupled to the inner periphery of the second end wall. The baffle plate extends a first width toward the first end wall and at least partially defines a ring-shaped chamber. The baffle plate is configured to deflect an airflow entering through the aperture to control a distribution of the airflow from the ring-shaped chamber.

In another aspect, a cooling system for a totally enclosed electric motor assembly is provided. The system includes a motor having a substantially cylindrical housing having a central longitudinal axis. The housing is configured to substantially completely enclose the motor. The housing comprises a plurality of cooling fins substantially covering and extending outward from the housing. The cooling fins extend along a direction substantially parallel to the central longitudinal axis. The motor also includes an end bracket coupled to an end of the housing using a plurality of fasteners. The system includes a radial blower configured to generate airflow for cooling the motor. The system also includes an air guide coupled to the motor. The air guide is configured to channel the airflow along the cooling fins to facilitate dissipating heat from the motor.

In another aspect, a method of cooling a totally enclosed motor is provided. The motor has a substantially cylindrical housing defining a central longitudinal axis and an end bracket coupled to an end of the housing using a plurality of fasteners. The housing includes a plurality of cooling fins substantially covering and extending outward from the housing. The cooling fins extend along a direction substantially parallel to the central longitudinal axis. The method includes providing a radial blower for generating an airflow to cool the totally enclosed motor. The method also includes providing an air guide having a ring-shaped chamber defined therein. The method further includes forcing the airflow into the ring-shaped chamber of the air guide. The method includes guiding the airflow from the ring-shaped chamber along the housing of the totally enclosed motor.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure provides a radial blower air guide that is configured to bolt directly to an end bracket of an electric motor, eliminating the need for a special cast iron end bracket, and in the instance of an explosion-proof motor, maintaining its explosion-proof rating. Specifically, the radial blower air guide includes a unique internal baffling system that improves air flow over an electric motor housing, and can be configured to attach to any totally enclosed electric motor. The exemplary radial blower air guide is lighter weight than a conventional cast iron blower shroud and is also more compact, which reduces the overall electric motor length for critical space restrictions in tight applications.

Figure 1:
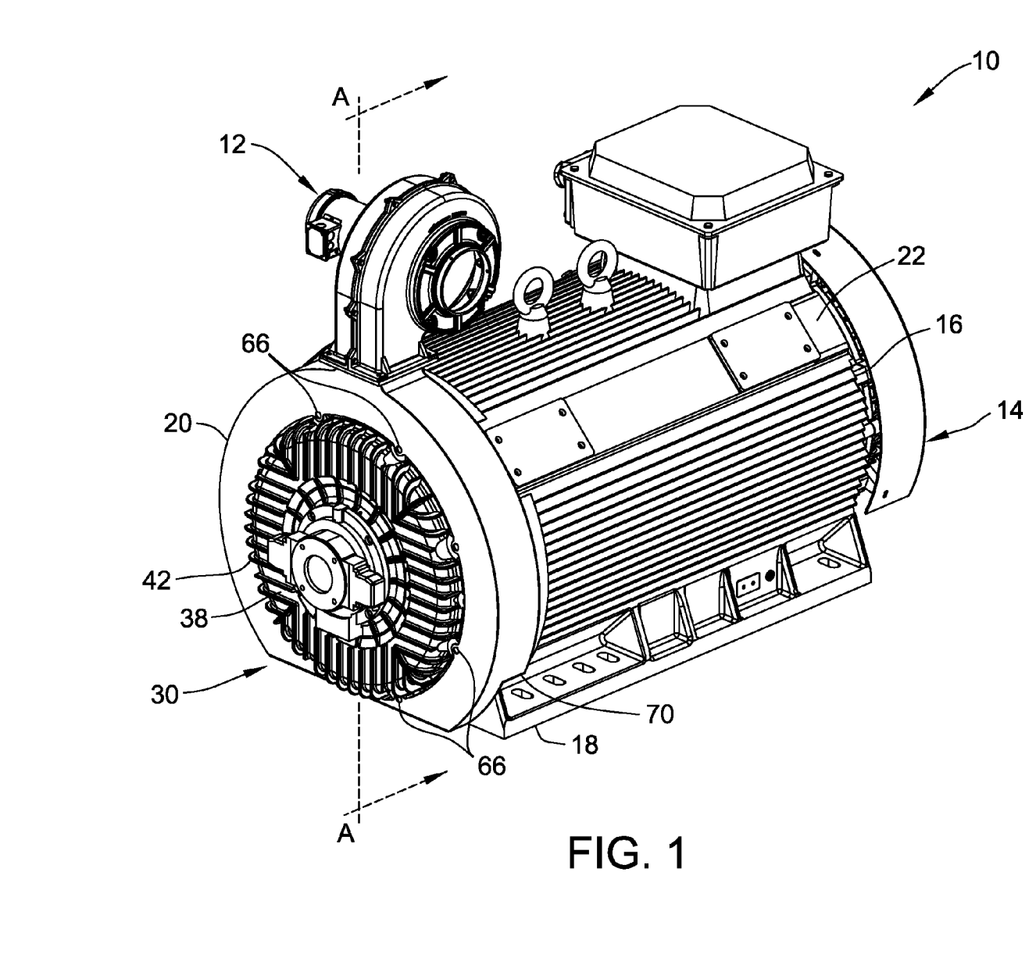
FIG. 1 is a schematic perspective of an exemplary electric motor cooled by a radial blower and including a radial blower air guide.
Figure 2:
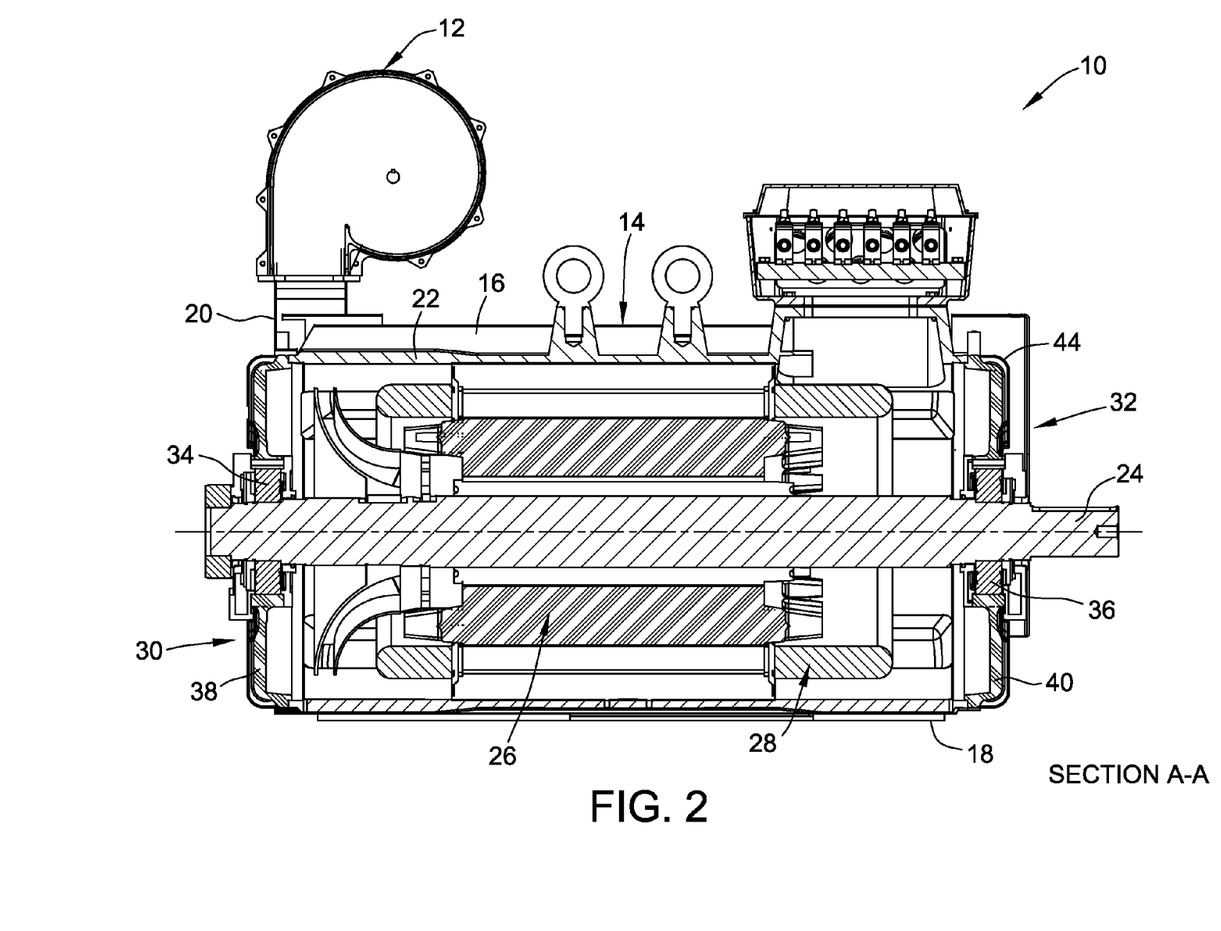
FIG. 2 is a cross-sectional view of the electric motor of FIG. 1 taken along line A-A.
Figure 3:
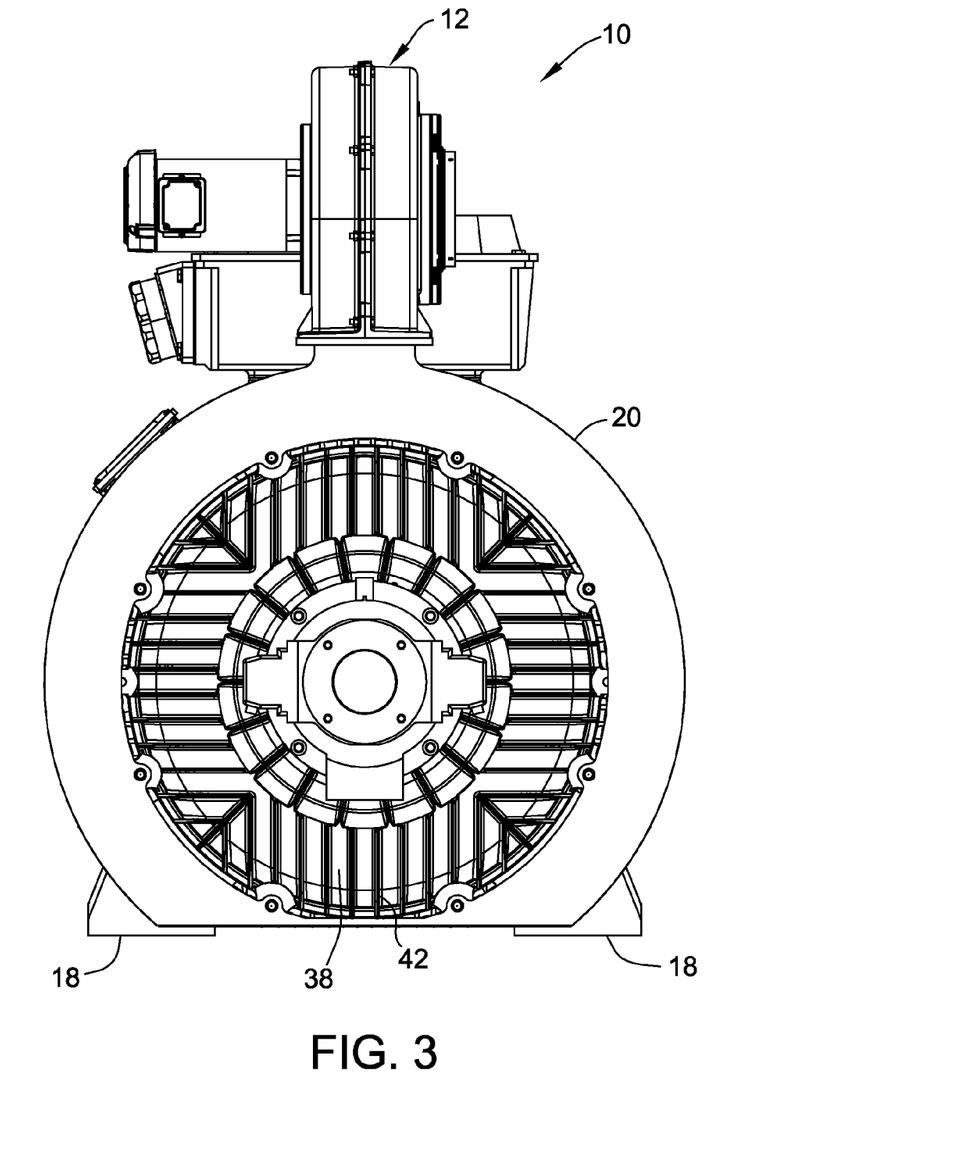
FIG. 3 is an end view of the electric motor of FIG. 1.

FIGS. 1-3 illustrate an exemplary embodiment of a blower and motor assembly 10 including a radial blower 12, a motor 14, and a radial blower air guide 20 (air guide). In the exemplary embodiment, motor 14 is a totally enclosed motor that generally includes a substantially cylindrical housing 22 that substantially completely encloses motor 14 to facilitate inhibiting the intrusion of dirt and/or other harmful contaminants into motor 14. Housing 22 includes a plurality of cooling fins 16 substantially covering and extending outward from housing 22 along a direction substantially parallel to a central longitudinal axis of motor 14. In addition, motor 14 includes a pair of support brackets 18 located at the bottom of housing 22.

Motor 14 includes a rotor 26 that is coupled to a rotor shaft 24 that is rotatably coupled within housing 22 extending through a central longitudinal axis of motor 14. Rotor 26 is surrounded by a stator 28 that is coupled to housing 22. Rotor shaft 24 is supported by a bearing assembly 36 located at a drive end 32 of motor 14 and a bearing assembly 34 located at an end 30 opposite drive end 32 of motor 14. Bearing assemblies 34 and 36 are generally supported by circular end brackets 38 and 40, respectively. In the exemplary embodiment, circular end brackets 38 and 40 include cooling fins 42 and 44, respectively, similar to cooling fins 16. Alternatively, circular end brackets 38 and 40 may be smooth and free of cooling fins.

The air guide 20 is securely coupled to end 30 of motor 14, opposite drive end 32 and external to housing 22, and is configured to attach directly to circular end bracket 38, eliminating the need for a special cast iron end bracket. Radial blower 12 is coupled to air guide 20 and provides airflow along housing 22. Cool air from radial blower 12 is deflected by air guide 20 through the channels formed by cooling fins 16 on housing 22 of motor 14.

FIGS. 4-11 illustrate air guide 20. Air guide 20 is configured to be secured to end 30 of motor 14 using the same fasteners engaged to fasten circular end bracket 38 to housing 22. An advantage provided by air guide 20 is that it is lightweight, easy to install, and can be used to convert any axial fan cooled motor into a radial blower cooled motor without needing a new end bracket assembly.

Figure 6:
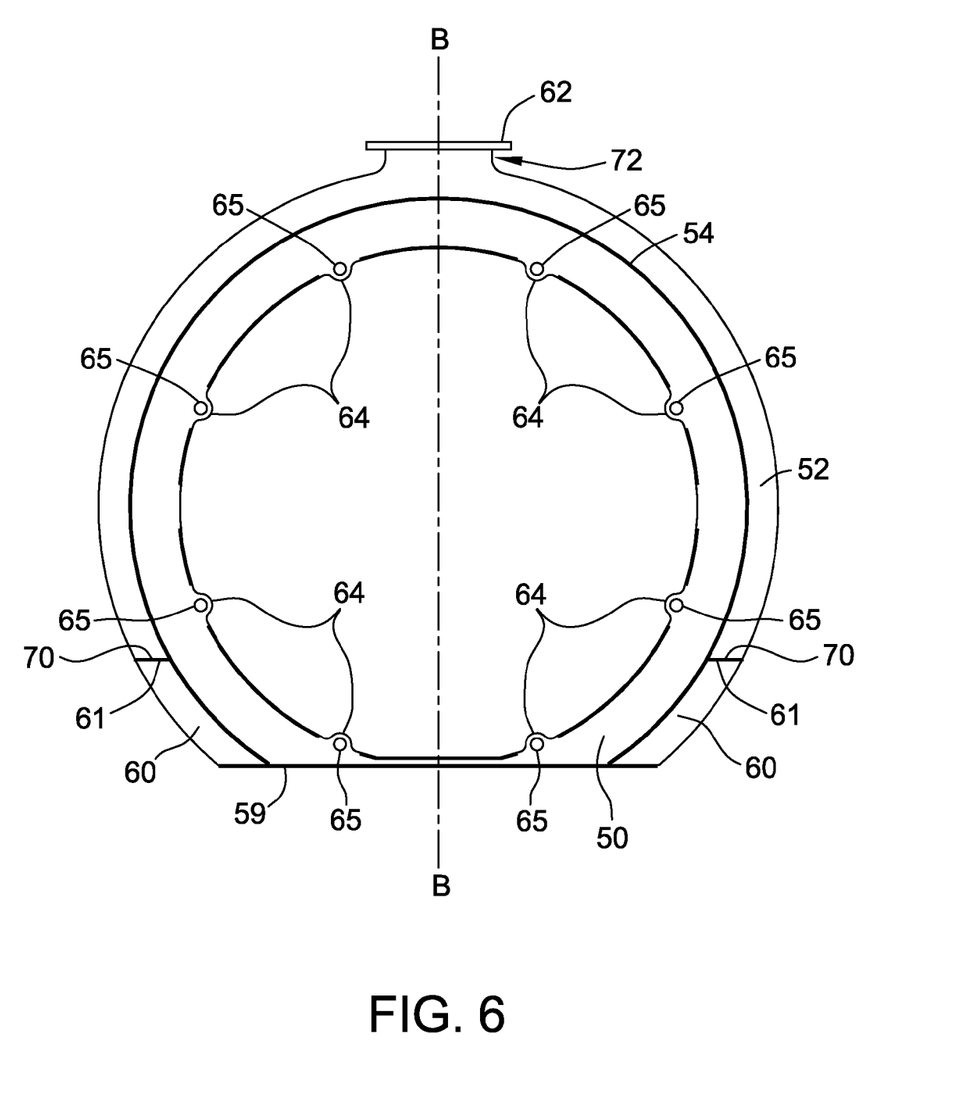
FIG. 6 is a front view of the radial blower air guide of FIG. 4.

In the exemplary embodiment, air guide 20 is shown as one piece that couples to the periphery of end bracket 38 of motor 14. As shown in FIG. 6, the exemplary air guide 20 is substantially symmetrical with respect to a vertical line B, which, when viewed from the front, is substantially centered on component holding structure 10. Alternatively, Air guide 20 may include features and/or elements that are not symmetrical with respect to each other with respect to vertical line B. The terms front, rear, left, and right are used for convenience to indicate relative positional relationships.

In the exemplary embodiment, air guide 20 is substantially circular in shape. Air guide 20 is fabricated by coupling sheet material components together to form air guide 20. In the exemplary embodiment, air guide 20 is fabricated by welding sheet metal components together. Alternatively, air guide 20 may be fabricated from any sheet material that permits air guide 20 to operate as described herein.

In the exemplary embodiment, air guide 20 includes a plurality of sheet material components including a rear wall 50, a front wall 52, a baffle plate 54, and a pair of outer walls 56. The exemplary embodiment of air guide 20 also includes a plurality of inner walls 58, a bottom wall 59, a pair of mid-walls 60, a pair of bottom caps 61, and a blower flange 62.

Rear wall 50 is generally formed as a truncated annular ring defined by an inner periphery that substantially circumscribes the periphery of circular end bracket 38 as illustrated in FIG. 3. Rear wall 50 further includes a generally flat bottom edge configured to clear a mounting surface (not shown) of motor 14. Alternatively, rear wall 50 can be entirely circular or have any shape that permits air guide 20 to operate as described herein.

Rear wall 50 includes a plurality of mounting tabs 64 extending inward from the inner periphery of rear wall 50. Each of mounting tabs 64 includes an aperture 65 defined therethrough. Mounting tabs 64 are positioned in a spaced relationship with each other and are adapted to align with and mount to attachment bosses 66 of circular end bracket 38. In the exemplary embodiment, rear wall 50 includes eight mounting tabs 64 substantially equally spaced about the inner periphery of rear wall 50. Alternatively, rear wall 50 may have any number of mounting tabs 64 spaced at any distance that permits rear wall 50 to attach to motor 14. Rear wall 50 may only include an amount of mounting tabs 64 predetermined to be necessary to securely mount rear wall 50 to circular end bracket 38, and may not include a respective mounting tab for each of attachment bosses 66.

Figure 7:
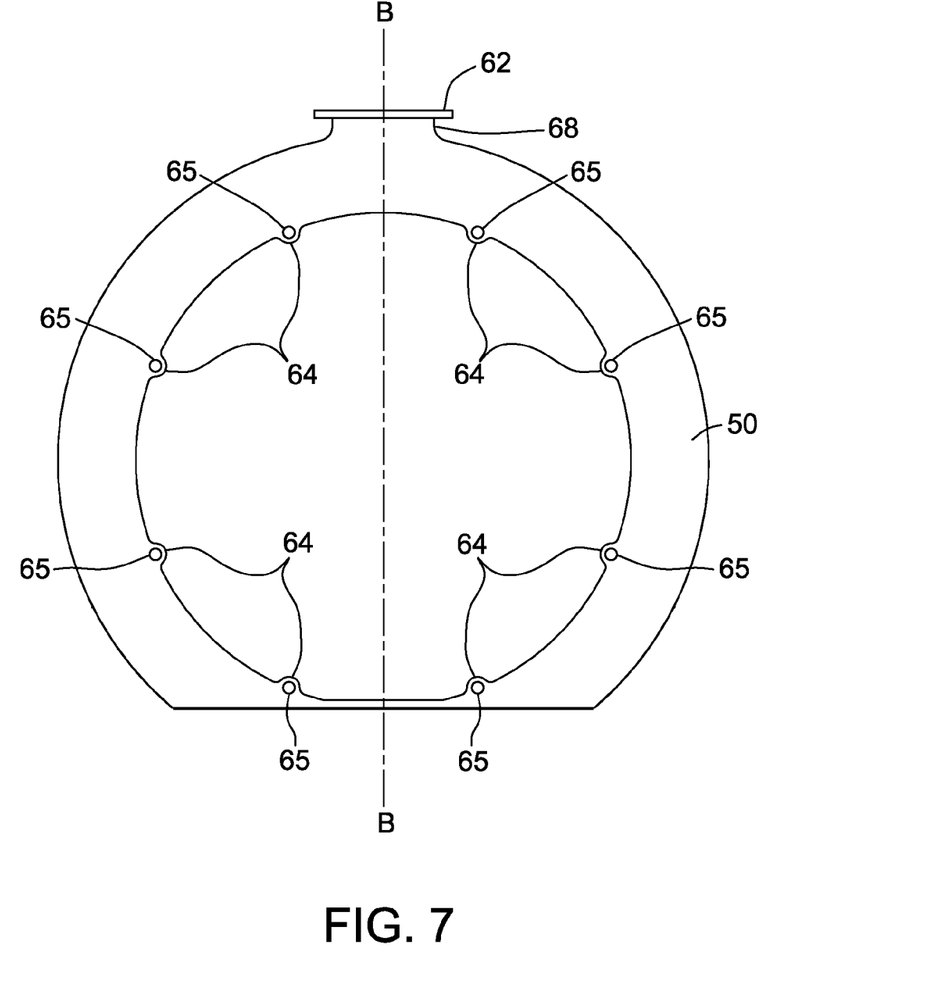
FIG. 7 is a rear view of the radial blower air guide of FIG. 4.

In the exemplary embodiment, rear wall 50 is further defined by an outer periphery spaced apart from the inner periphery a predefined distance greater than a periphery defined by the edges of cooling fins 16 in relation to the central longitudinal axis of motor 14. Rear wall 50 includes a neck portion 68 that extends upward from the outer periphery of rear wall 50 and includes a substantially flat top edge configured to couple to blower flange 62. As illustrated in FIG. 7, neck portion 68 is provided in a position that is substantially symmetric in relation to line B. Alternatively, neck portion 68 may be provided in any position about the outer periphery of rear wall 50 that permits air guide 20 to operate as described herein.

Figure 4:
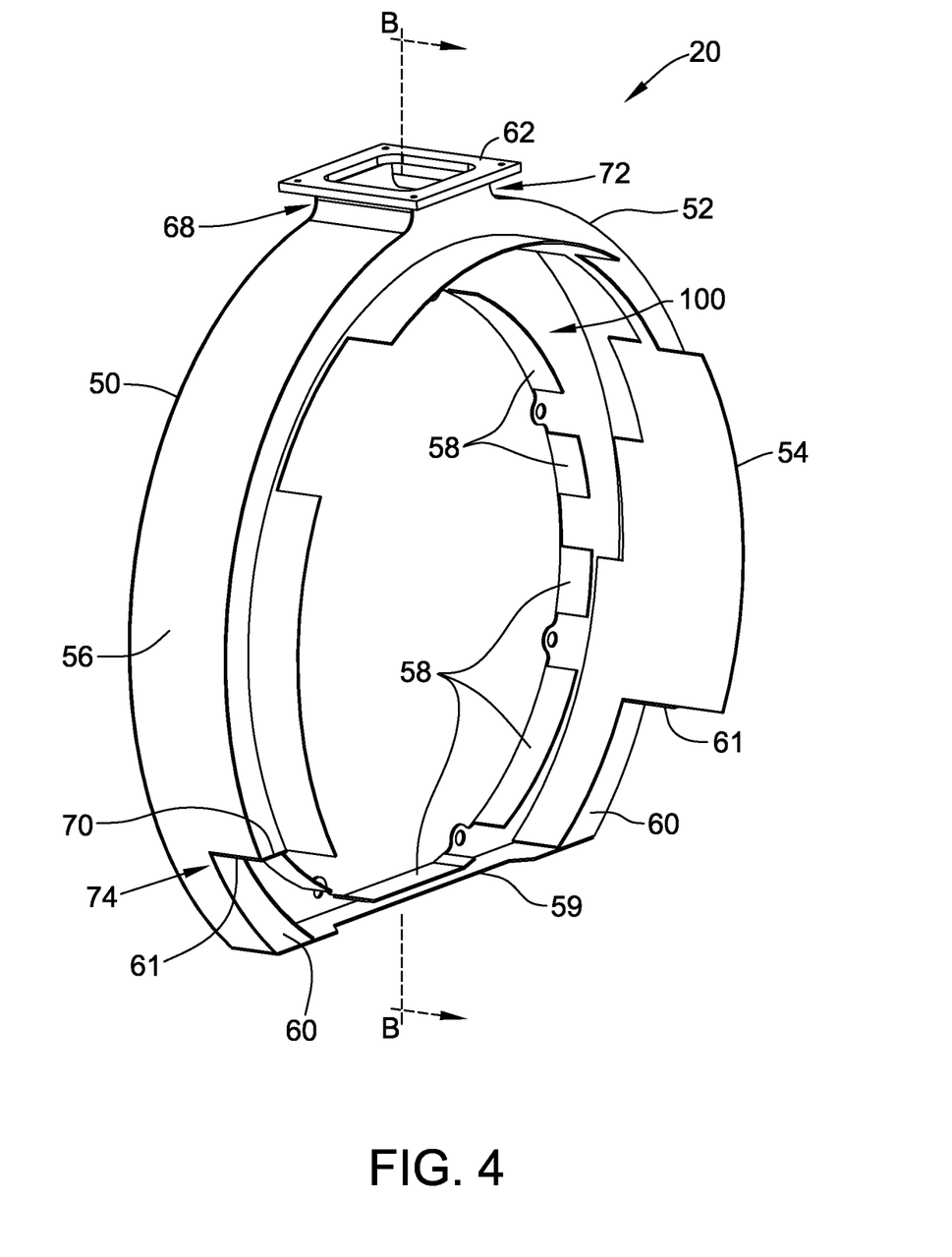
FIG. 4 schematic perspective of an exemplary radial blower air guide.
Figure 8:
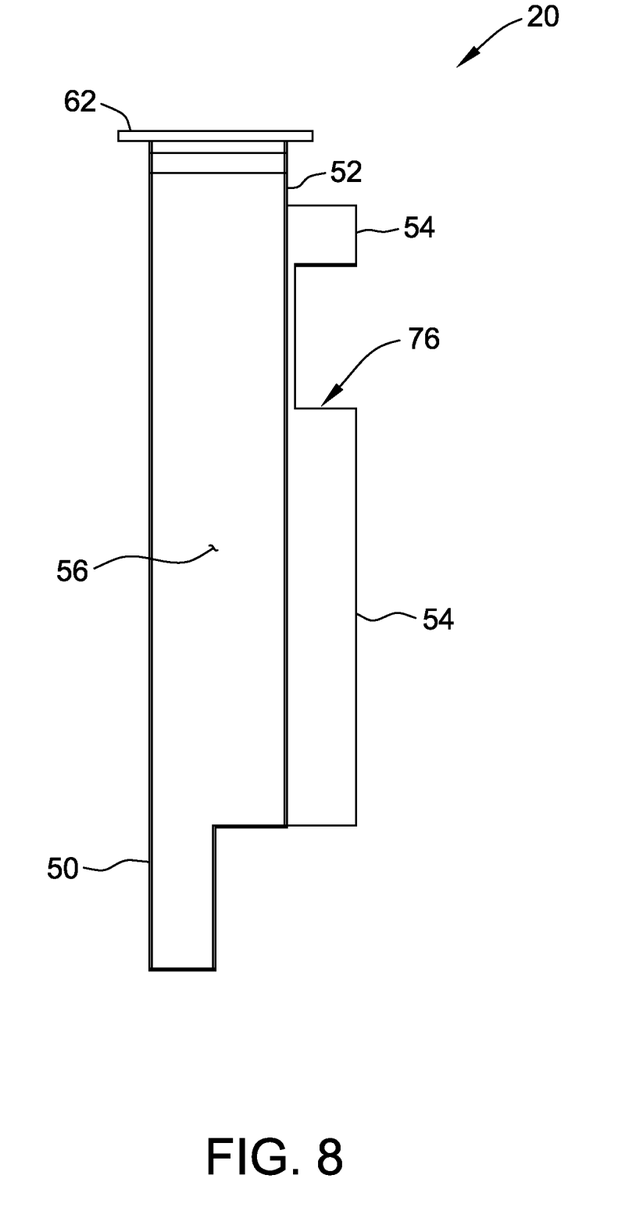
FIG. 8 is a side view of the radial blower air guide of FIG. 4.

Referring to FIGS. 4 and 8, air guide 20 includes front wall 52 spaced a predefined distance forward of rear wall 50. In the exemplary embodiment, front wall 52 and rear wall 50 are substantially parallel. Alternatively, front wall 52 and rear wall 50 may be angled in relation to each other at any angle that permits air guide 20 to operate as described herein. Referring to FIG. 6, front wall 52 is generally formed as a truncated circular shape with a predefined inner periphery that generally circumscribes the periphery of housing 22. Front wall 52 includes an outer periphery that is substantially equal to the outer periphery of rear wall 50. Alternatively, the outer periphery of front wall 52 can be any shape that permits air guide 20 to operate as described herein. Front wall 52 also includes a neck portion 72 extending upward from the outer periphery of front wall 52. Neck portion 72 is configured substantially identical to neck portion 68 of rear wall 50.

Front wall 52 is configured such that lower edges 70 do not contact support brackets 18 located at the bottom of housing 22. Alternatively, front wall 52 can be entirely circular or have any shape that permits air guide 20 to operate as described herein.

Referring back to FIG. 4, air guide 20 includes outer walls 56. In the exemplary embodiment, outer walls 56 are provided in positions that are symmetric to each other in relation to line B. Outer walls 56 are formed from thin circular plate material and are configured to extend along the outer edges of rear wall 50 and the outer edges of front wall 52, forming a ring-shaped chamber 100 therebetween. Outer walls 56 extend from the upper edges of neck portions 68 and 72, to the lower truncated edges of rear wall 50 and front wall 52, respectively, with the bottom edges of outer walls 56 being substantially parallel to the central longitudinal axis of motor 14. A lower portion of outer walls 56 includes a rectangular-shaped notch 74 configured to clear support brackets 18 located at the bottom of housing 22. Alternatively, outer walls 56 can be formed in any shape that permits air guide 20 to operate as described herein.

In the exemplary embodiment, air guide 20 includes a plurality of inner walls 58 formed as curved thin plates. Inner walls 58 are configured to extend forward from the inner periphery of rear wall 50 and are spaced radially outward from the central longitudinal axis of motor 14, so that cool air from radial blower 12 can be channeled to cooling fins 16 along the outside of housing 22. In the exemplary embodiment, inner walls 58 are configured as separate components spaced apart from mounting tabs 64 such that they do not contact attachment bosses 66 of circular end bracket 38. Alternatively, inner walls 58 can be configured in any manner that permits inner walls 58 to operate as described herein.

Figure 10:
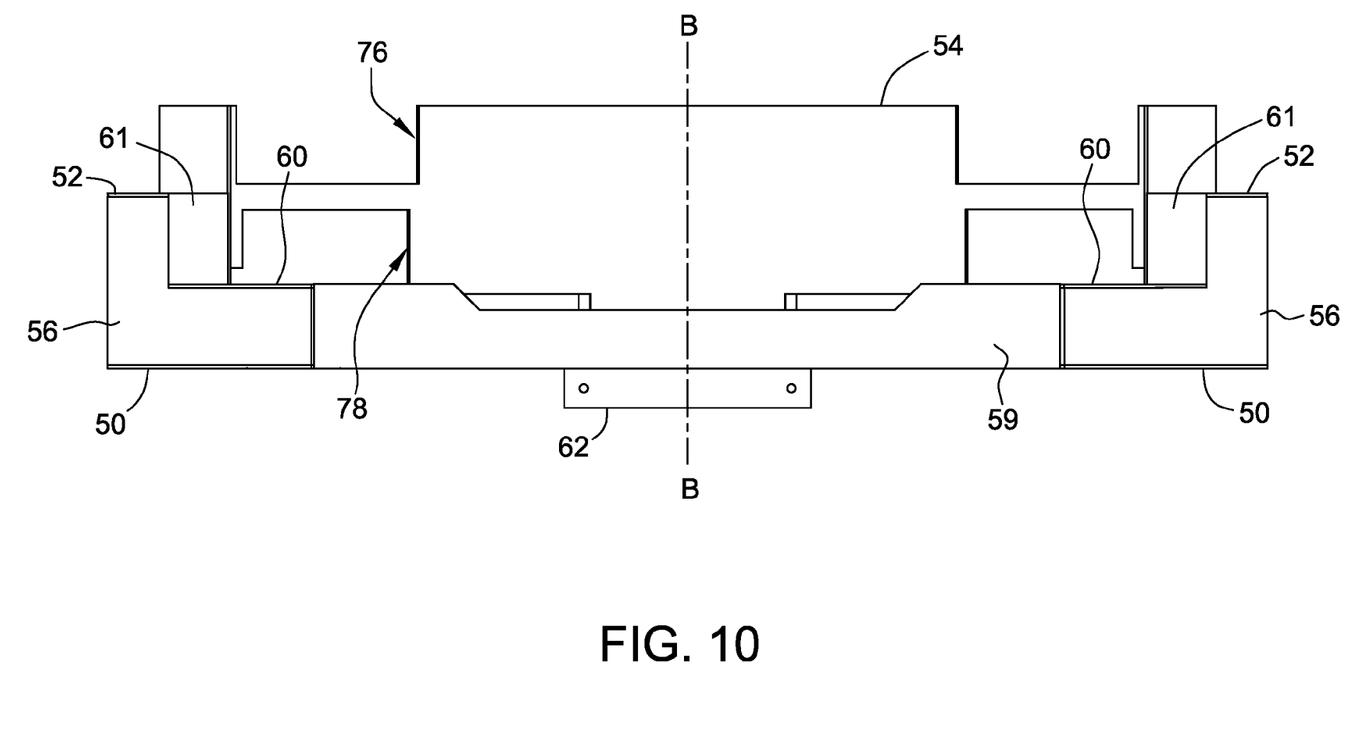
FIG. 10 is a bottom view of the radial blower air guide of FIG. 4.

With reference to FIG. 10, in the exemplary embodiment, bottom wall 59 is coupled to the truncated edge of rear wall 50 and the bottom edges of outer walls 56. Bottom wall 59 extends forward from rear wall 50 a distance equal to a distance of the bottom edge of outer walls 56, which is defined by rectangular-shaped notch 74. Furthermore, in the exemplary embodiment, air guide 20 includes bottom caps 61 provided in positions symmetric to each other in relation to line B. Bottom caps 61 are coupled to a respective truncated edge of front wall 52 and a horizontal edge of outer walls 56 defined by rectangular-shaped notch 74. Bottom wall 59 and bottom caps 61 at least partially define chamber 100.

With reference to FIGS. 4 and 6, air guide 20 includes mid-walls 60 that are provided in positions symmetric to each other in relation to line B. Mid-walls 60 are configured to further define chamber 100 and facilitate guiding air from radial blower 12 along housing 22. Mid-walls 60 are coupled to outer walls 56, respectively, bottom plate 59, and to a respective bottom cap 61. An inner periphery of mid-walls 61 is substantially equal to the inner periphery of front wall 52, and is concentric with the central longitudinal axis of motor 14.

In the exemplary embodiment, blower flange 62 is coupled to air guide 20 adjoining neck portions 68 and 72 and respective edges of outer walls 56. Blower flange 62 is provided in a position that is substantially symmetric in relation to line B. Alternatively, as described above, where neck portions 68 and 72 are located in a different position, blower flange 62 may be provided in any such different position that permits air guide 20 to operate as described herein. In the exemplary embodiment, blower flange 62 is substantially square in shape and has a substantially square-shaped hole defined therethrough. Alternatively, blower flange 62 may be any shape and have any shaped hole defined therethrough that permits blower flange 62 to operate as described herein. In addition, blower flange 62 includes apertures 63 defined therethrough for coupling radial blower 12 to blower flange 62. Blower flange 62 is fabricated from a plate material, such as steel, and is configured to support radial blower 12. Alternatively, blower flange 62 may be fabricated from any material that permits blower flange 62 to operate as described herein.

Figure 5:
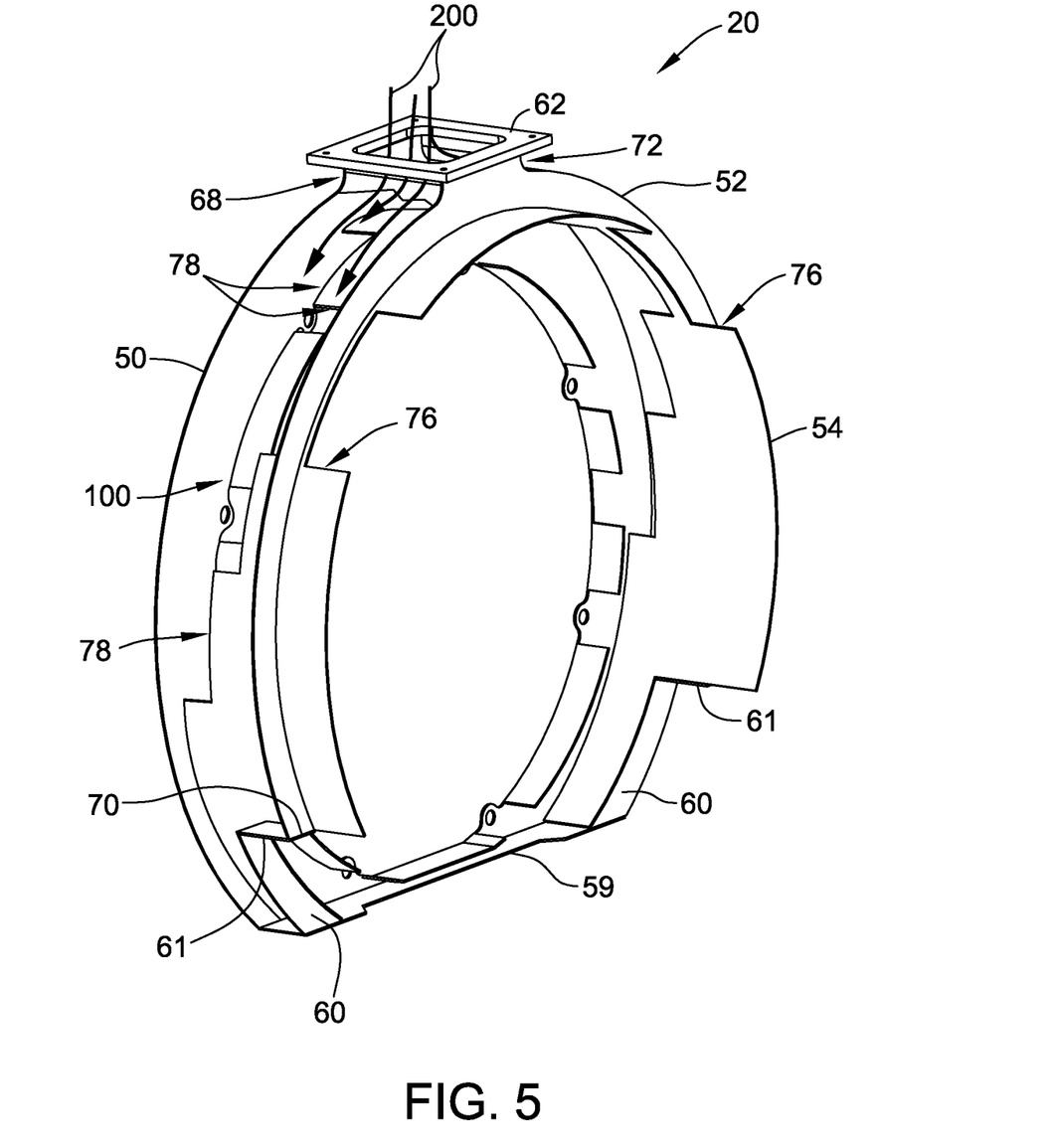
FIG. 5 is a schematic perspective of the radial blower air guide of FIG. 4 with an outer wall removed to show details of a baffle plate.

FIG. 5 is a schematic perspective of air guide 20 with outer walls 56 removed to show details of baffle plate 54. In the exemplary embodiment, baffle plate 54 is a substantially arcuate or circular plate spaced radially outward from the central longitudinal axis of motor 14 and coupled to the inner periphery of front wall 52. Baffle plate 54 extends forward from front wall 52 a predefined distance along the outer periphery of cooling fins 16 of housing 22, so that cool air from radial blower 12 is guided through the channels formed by cooling fins 16 on housing 22 of motor 14. In the exemplary embodiment, baffle plate 54 includes a plurality of notches 76 defined forward of front wall 52 and configured to clear features of motor 14 other than cooling fins 16. For example, baffle plate 54 may include notches 76 that are adapted to provide clearance for access panels to the interior of motor 14. Alternatively, baffle plate 54 may be configured to include any feature shape or be a continuous circular plate forward of front wall 52 that permits air guide 20 to operate as described herein.

Figure 9:
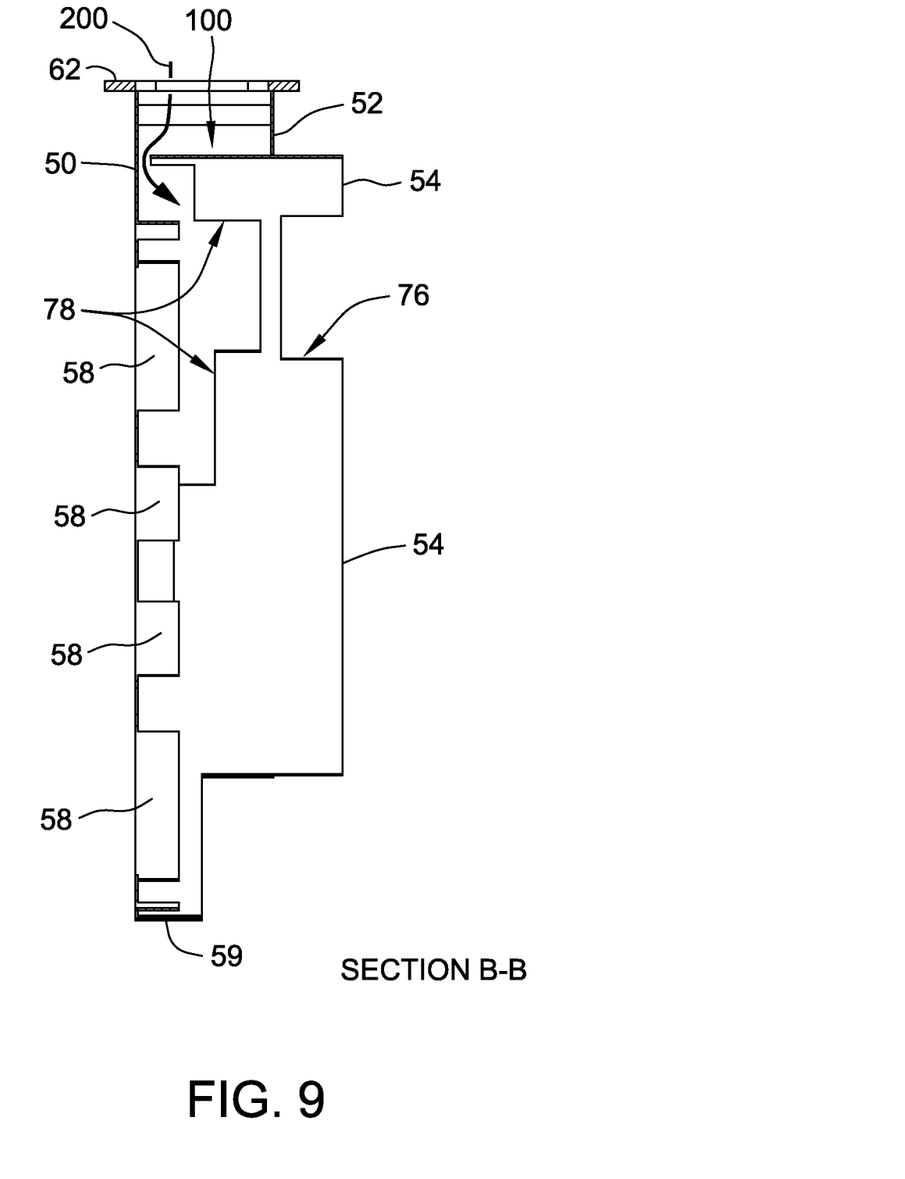
FIG. 9 is a cross-sectional view of the radial blower air guide of FIG. 4 taken about line B.
Figure 11:
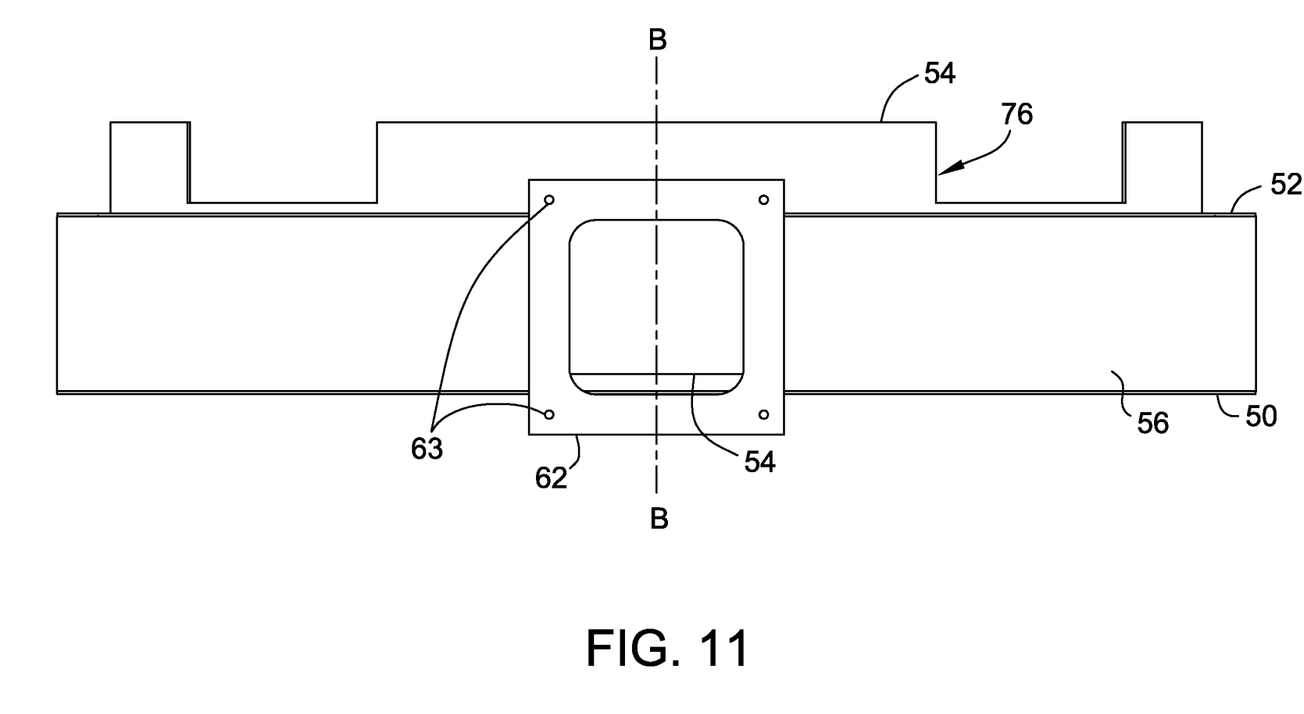
FIG. 11 is a top view of the radial blower air guide of FIG. 4.

Baffle plate 54 also extends rearward from front wall 52 and at least partially defines chamber 100. In the exemplary embodiment, baffle plate 54 includes a plurality of notches 78 defined rearward of front wall 52 and spaced apart circumferentially around baffle plate 54. Alternatively, baffle plate 54 may include any number of notches arranged in any spaced relationship that permits baffle plate 54 to operate as described herein. With reference to FIG. 9, it is shown that notches 78 are spaced various predefined distances from rear wall 50. Notches 78 are configured to guide an airflow 200 generated by radial blower 12 such that it is substantially uniformly distributed around the periphery of housing 22. As illustrated in FIGS. 9 and 11, it is shown in the exemplary embodiment that a portion of baffle plate 54 beneath blower flange 62 extends rearward from front wall 52 generally spanning a substantial portion of chamber 100. This facilitates deflecting a substantial amount of airflow 200 from radial blower 12 to the sides of chamber 100. A reduced amount of airflow 200 can pass through a gap defined between baffle plate 54 and rear wall 50 where it is deflected by inner walls 58 through the channels formed by cooling fins 16 on housing 22 of motor 14. Further, a reduced amount of airflow 200 is deflected to each side of chamber 100. Moving around the circumference of baffle plate 54, it is shown that notches 78 are spaced apart from rear wall 50 different predetermined amounts and define larger gaps for airflow 200 to pass through. This facilitates substantially uniformly distributing airflow 200 around the periphery of housing 22.

An exemplary method of cooling motor 14 of FIG. 1 is provided herein. The method includes providing radial blower 12 (Shown in FIG. 1) for generating airflow 200 (Shown in FIG. 5) to cool motor 14. Motor 14 generally includes housing 22 (Shown in FIG. 1) and circular end brackets 38 and 40 (Shown in FIG. 1) that substantially completely enclose motor 14. Housing 22 includes a plurality of cooling fins 16 substantially covering and extending outward from housing 22. In addition, motor 14 includes rotor 26 coupled to rotor shaft 24 rotatably coupled within housing 22 and extending through a central longitudinal axis of motor 14. Rotor 26 is surrounded by a stator 28 that is coupled to housing 22. The method also includes providing air guide 20 configured to guide airflow 200 to cooling fins 16 along the outside of housing 22 of motor 14. Air guide 20 generally includes rear wall 50, front wall 52, and outside walls 56 that define chamber 100 therein. In addition, air guide 20 includes blower flange 62 that is configured to couple to radial blower 20 and direct airflow 200 into chamber 100. Air guide 20 further includes baffle plate 54 including a plurality of Notches 78 configured to guide airflow 200 such that it is substantially uniformly distributed around the periphery of housing 22. The method further includes forcing the cooling air of airflow 200 into chamber 100 of air guide 20. In addition, the method includes guiding airflow 200 from chamber 100 of air guide 20 along housing 22 of motor 14.

The apparatus, methods, and systems described herein provide a radial blower air guide that is configured to bolt up directly to an end bracket of a totally enclosed electric motor. The exemplary radial blower air guide includes a baffle plate configured to guide cooling air in a substantially uniform distribution around the periphery of the motor housing. Moreover, the benefits derived from the radial blower air guide include eliminating the need for a special cast iron end bracket typically required for totally enclosed electric motors, reducing the weight of the motor assembly, reducing the overall length of the motor installation, and providing unimpeded access to the motor shaft for installation of components such as brakes, encoders, and the like. In addition, the radial blower air guide is configured to attach directly to an existing end plate of the motor housing, thereby maintaining an original rating of the motor, such as with an explosion-proof motor. The exemplary embodiments described herein provide apparatus, systems, and methods particularly well-suited for industrial electric motors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air guide for use with an electric motor having a central longitudinal axis, said air guide comprising:
   a first end wall substantially circumscribing an end bracket of the electric motor;
   a second end wall spaced apart from said first end wall, said second end wall having an inner periphery that substantially circumscribes a periphery of the electric motor;
   an outer wall extending from an edge of said first end wall about at least a portion of the circumference thereof, said outer wall extending to an edge of said second end wall, said outer wall being termed from a thin curved plate and at least partially defining a ring-shaped chamber for channeling airflow, said ring-shaped chamber defined between said first end wall and said second end wall, said outer wall having an aperture defined therethrough, said aperture in flow communication with said ring-shaped chamber; and
   a baffle plate coupled to said inner periphery of said second end wall, said baffle plate extending a first width toward said first end wall and at least partially defining said ring-shaped chamber, said baffle plate configured to deflect an airflow entering said ring-shaped chamber through said aperture to control a distribution of said airflow from said ring-shaped chamber.

2. The air guide in accordance with claim 1, wherein said baffle plate is formed from a thin curved plate.

3. The air guide in accordance with claim 2, wherein said baffle plate is substantially arcuate.

4. The air guide in accordance with claim 1, wherein said baffle plate extends a second width away from said first end wall along the periphery of the electric motor.

5. The air guide in accordance with claim 1, wherein at least a portion of said first width is dimensioned in such a manner to define a gap between said first end wall and said baffle plate.

6. The air guide in accordance with claim 5, wherein said first width is dimensioned in such a manner that the gap size changes along a length of said baffle plate.

7. The air guide in accordance with claim 1, wherein said baffle plate comprises a plurality of notches.

8. The air guide in accordance with claim 7, wherein a respective notch of said plurality of notches is spaced a predefined distance from said first end wall such that said airflow is substantially uniformly distributed around an inner periphery of said ring-shaped chamber.

9. The air guide in accordance with claim 1, further comprising a blower flange coupled to said outer wall, said blower flange having a hole defined therethrough corresponding to said aperture.

10. The air guide in accordance with claim 1, further comprising a plurality of inner walls coupled to said first end wall, said plurality of inner walls spaced radially outward from the central longitudinal axis of the electric motor.

11. The air guide in accordance with claim 1, wherein said air guide is configured to channel said airflow along the periphery of the electric motor.

12. An air guide for use with an electric motor having a central longitudinal axis, said air guide comprising:
    a first end wall substantially circumscribing an end bracket of the electric motor;
    a second end wall spaced apart from said first end wall, said second end wall having an inner periphery that substantially circumscribes a periphery of the electric motor;
    an outer wall extending from an edge of said first end wall about at least a portion of the circumference thereof, said outer wall extending to an edge of said second end wall, said outer wall being formed from a thin curved plate and at least partially defining a ring-shaped chamber between said first end wall and said second end wall, said outer wall having an aperture defined therethrough; and
    a baffle plate coupled to said inner periphery of said second end wall, said baffle plate extending a first width toward said first end wall and at least partially defining said ring-shaped chamber, said baffle plate configured to deflect an airflow entering through said aperture to control a distribution of said airflow from said ring-shaped chamber, wherein said baffle plate comprises a plurality of notches, a respective notch of said plurality of notches spaced a predefined distance from said first end wall such that said airflow is substantially uniformly distributed around an inner periphery of said ring-shaped chamber.

13. The air guide in accordance with claim 12, wherein said baffle plate is formed from a thin curved plate.

14. The air guide in accordance with claim 13, wherein said baffle plate is substantially arcuate.

15. The air guide in accordance with claim 12, Wherein said baffle plate extends a second width away from said first end wall along the periphery of the electric motor.

16. The air guide in accordance with claim 12, wherein at least a portion of said first width is dimensioned in such a manner to define a gap between said first end wall and said baffle plate.

17. The air guide in accordance with claim 16, wherein said first width is dimensioned in such a manner that the gap size changes along a length of said baffle plate.

18. The air guide in accordance with claim 12, further comprising a blower flange coupled to said outer wall, said blower flange having a hole defined therethrough corresponding to said aperture.

19. The air guide in accordance with claim 12, further comprising a plurality of inner walls coupled to said first end wall, said plurality of inner walls spaced radially outward from the central longitudinal axis of the electric motor.

20. The air guide in accordance with claim 12, wherein said air guide is configured to channel said airflow along the periphery of the electric motor.

\* \* \* \* \*